Oct. 19, 1937.  H. HEINE  2,096,325
MICROSCOPE
Filed Jan. 16, 1935
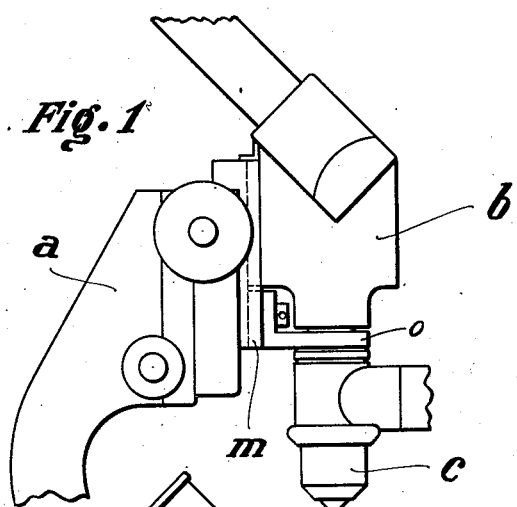
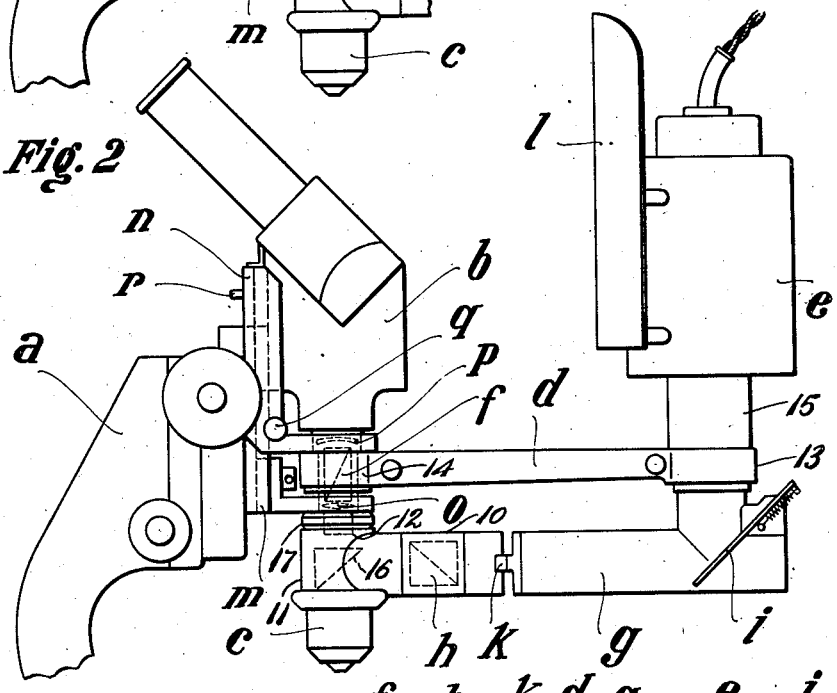
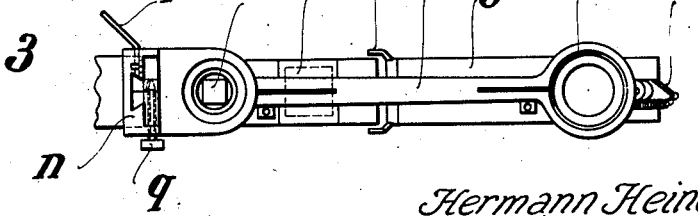
Hermann Heine
INVENTOR
BY
ATTORNEY Patented Oct. 19, 1937

2,096,325

UNITED STATES PATENT OFFICE 2,096,325

MICROSCOPE

Hermann Heine, Wetzlar, Germany, assignor to Ernst Leitz, G. m. b. H., Wetzlar, Germany Application January 16, 1935, Serial No. 1,984
In Germany February 19, 1934

1 Claim. (Cl. 88—39)

This invention relates to improvements in microscopes and it is the principal object of my invention to combine with the microscope an auxiliary apparatus as for instance a source of light rotating about the microscope axis by means of a non-rigid connection so that an opaque illuminator must participate in the rotation of the source of light to ensure a perfect illumination of the object under the microscope objective at all times.

Another object of my invention is the provision of a microscope in which, between microscope tube and objective, a holder for a source of light is so arranged as to turn about the axis of the microscope.

A further object of my invention is the provision of a microscope equipped with an extension pipe stem on the objective casing containing an opaque illuminator and non-rigidly connected to a tube to which the connection element for stem and tube is rotatably secured and in which is arranged an angularly arranged mirror reflecting the light rays from the source of light.

These and other objects and advantages of my invention will become more fully known as the description thereof proceeds, and will then be more specifically defined in the appended claim.

In the accompanying drawing forming a material part of this disclosure:

Fig. 1 is a fragmentary side elevation of a microscope constructed according to my invention.

Fig. 2 is a view similar to Figure 1 with a source of light combined with the microscope.

Fig. 3 is a fragmentary top plan view of the apparatus, Figure 2.

As illustrated, between the tube $b$ and the objective $c$ of a microscope a holder member $d$ is turnably arranged and carries a rotatable source of light, designated $e$. Between the support $a$ of the microscope and the tube $b$ is arranged the tube guide $m$ provided with an angular extension $n$ at the apex of which a screw is arranged which is designated $q$. An analyzer $f$ with an optical lens system $p$ and $o$ is provided between tube $b$ and the carrier for the objective $c$ for the compensation of the length of the tube.

As shown in Figure 2, the tube $b$ has a lower stem $12$, in which the analyzer $f$ is located and which extends through the horizontal arm $o$ of a bracket attached to the guide $m$. This guide carries the extension $n$ supporting the tube $b$ and is adjustable in height by means of the screw $q$ while a handle $r$ acts as a stop.

The holder $d$ has at both of its ends formed therewith suitable sockets $13$, $14$, and in the outer of these sockets, $13$, is held the stem $15$ of the source of light $e$, while through the inner of the sockets, $14$, the stem $12$ of the tube $b$ extends in which the analyzer $f$ is located, so as to allow a relative rotation.

The objective carrier $c$ has in its tube $11$ a reflector $16$ of a conventional type, and the carrier $c$ has the inner part of an extension pipe $10$ connected thereto as shown in Figure 2, which contains the opaque illuminator $h$ and is connected, as at $k$, to a tubular extension $g$. The extension pipe $10$ is connected to the tube $11$ which by means of a suitable socket $17$ is suspended from the stem $12$ of the tube $b$. A similar connection is for instance shown in my Patent No. 1,448,592 of March 13, 1923.

An opaque illuminator $h$ is arranged in a side extension tube $10$ attached to the objective carrier and an extension pipe $g$ is loosely connected, as at $k$, to the stem and carries an angularly arranged mirror $i$ so that the opaque illuminator participates in the rotation of the source of light about the axis of the microspope on account of the non-rigid connection between the opaque illuminator and the source of light, as the connection $k$ is rotatably connected to pipe or tube $g$.

A light and heat insulating blind $l$ is arranged between the source of light and the microscope.

The operation of my apparatus will be readily understood from the above description by inspection of the drawing, and it will be clear that the non-rigid connection between the source of light which is rotatably arranged with respect to the microscope will ensure a perfect illumination of the object under the microscope at all times.

It will be understood that I have described and shown the preferred form of my invention as one example only of the many possible ways to practically construct the same and that I may make such changes in its general arrangement and in the construction of its minor details as come within the scope of the appended claim without departing from the spirit of my invention and the principles involved.

Having thus described my invention, what I claim as new, and desire to secure by Letters Patent is:

A microscope comprising a tube and a stem therefor, an objective and a carrier therefor having a side extension tube, a support for said objective carrier in which the same and its side extension tube are rotatable, a source of light, and a holder therefor having a tubular stem, a means to clamp said holder to the microscope tube stem relative to which said objective carrier is rotatable, said clamping means being of a nature to permit rotation of the holder and the source of light relative to the microscope tube stem when said clamping means are loosened, an extension pipe on the stem of the holder for said source of light in alignment with said side extension tube, means on the extension pipe for rotating the side extension tube with the objective carrier when the light source holder is swung about the microscope tube stem, a means in the objective carrier stem for reflecting light to the objective, and an angularly arranged mirror in said extension pipe adapted to reflect light through said extension pipe and the tubular pipe stem to said means for reflecting light to the objective.

HERMANN HEINE.